Figure 1:
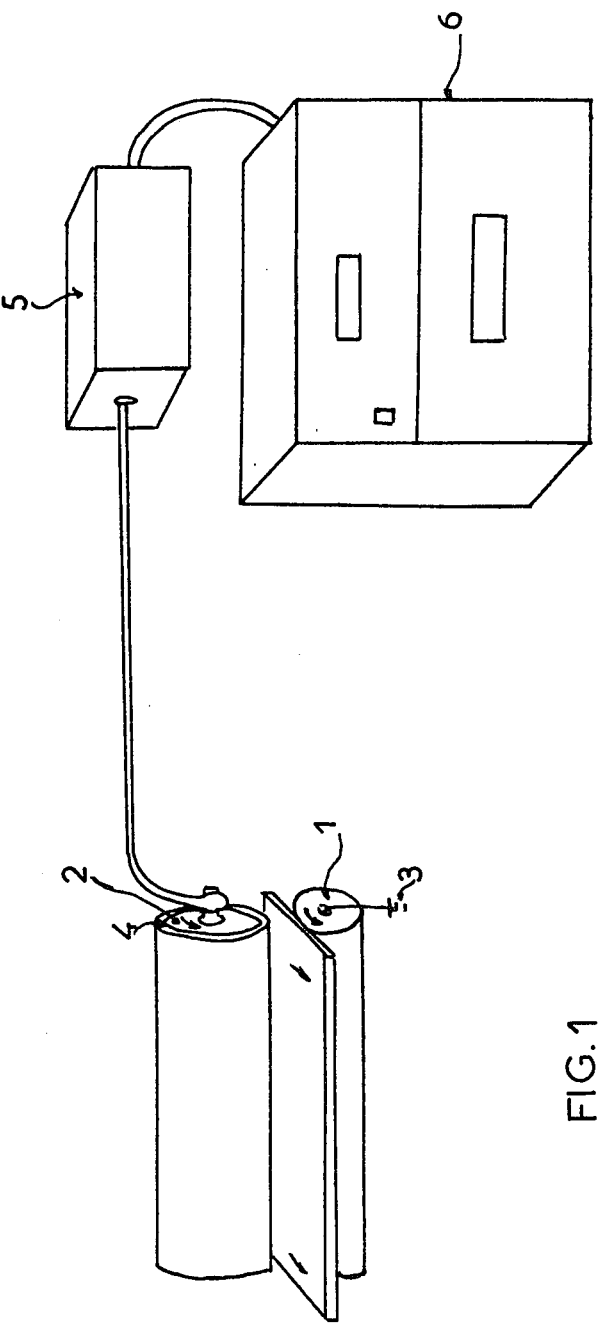

United States Patent [19]

Beraud et al.

[11] 4,273,635

[45] Jun. 16, 1981

[54] PROCESS AND APPARATUS FOR THE TREATMENT OF FIBROUS WEBS

[75] Inventors: Claudius Beraud, Tassin-la-Demi-Lune; Jean Jacquemart, Chatenay-Malabry, both of France

[73] Assignee: Institut Textile de France, Boulogne-Sur-Seine, France

[21] Appl. No.: 43,257

[22] Filed: May 29, 1979

[30] Foreign Application Priority Data

May 30, 1979 [FR] France ................... 78 16817

[51] Int. Cl.$^3$ .............................. C08F 2/52
[52] U.S. Cl. .......................... 204/165; 250/531
[58] Field of Search ................ 204/165, 168, 169

[56] References Cited

U.S. PATENT DOCUMENTS

| | | | |
|---|---|---|---|
| 2,864,755 | 12/1958 | Rothacker | 204/165 |
| 3,068,510 | 12/1962 | Coleman | 204/168 |
| 3,303,401 | 2/1967 | Naumann et al. | 204/165 UX |
| 3,475,307 | 10/1969 | Knox et al. | 204/168 |
| 3,817,701 | 6/1974 | Thorsen | 204/168 X |
| 4,028,551 | 6/1977 | Thompson | 250/531 |
| 4,059,497 | 11/1977 | Kolbe et al. | 204/165 |

FOREIGN PATENT DOCUMENTS

| | | |
|---|---|---|
| 714496 | 12/1941 | Fed. Rep. of Germany . |
| 1407318 | 6/1965 | France . |
| 1582162 | 9/1969 | France . |
| 2313185 | 12/1976 | France . |

*Primary Examiner*—F. C. Edmundson
*Attorney, Agent, or Firm*—Vaden & Bednar

[57] ABSTRACT

The invention relates to a process and apparatus for the treatment of bulky fibrous webs, derived at least partially from thermoplastic fibres, so as to impart cohesion to the webs. The process involves passing the webs between at least one pair of rotating cylindrical metallic electrodes, of which one is connected to a high frequency generator and the other is connected to earth, the web being compressed between the electrodes and being driven by them. One of the electrodes is covered with a layer of dielectric material having a smooth surface, and the discharges produced between the electrodes are partial discharges (or glow discharges), the path of which extends over only a part of the gap between the electrodes, starting from the electrode covered with dielectric material and extending to near the surface of the other electrode.

9 Claims, 6 Drawing Figures

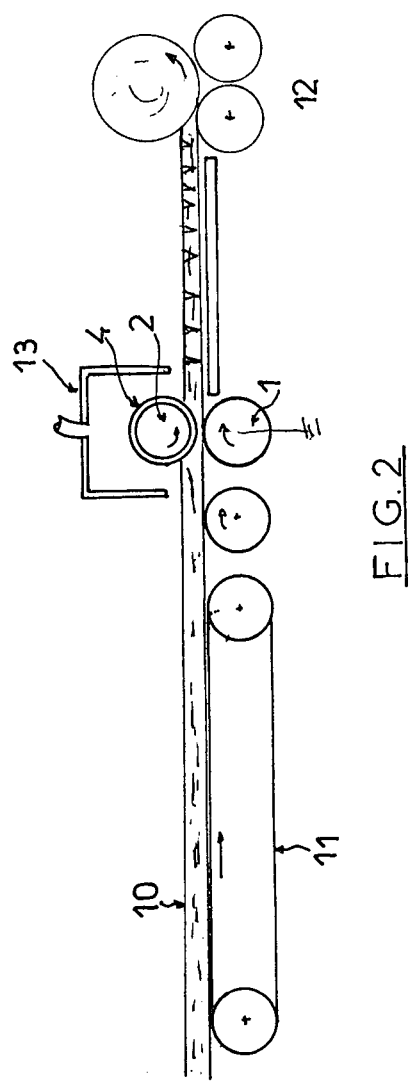

PROCESS AND APPARATUS FOR THE TREATMENT OF FIBROUS WEBS

The present invention relates to a process for the treatment of bulky fibrous webs obtained either by assembly (superposition) of a plurality of carded webs or the like, or directly by pneumatic means (Rando and the like). It relates, more particularly, to a process intended to impart cohesion and hold to such webs, whilst preserving their bulk. In preferred aspects, the invention provides a process for obtaining directly, from such webs, various composite materials comprising such webs associated with other materials on one or both faces and/or trapped in the central part of the webs. Such composite materials are particularly useful as padding materials, insulating materials and the like.

The invention also relates to apparatus for carrying out the process and to the products obtained.

It is well-known that the fibrous webs formed by assembling carded webs or obtained directly by means of pneumatic systems possess virtually no resistance to stress, the fibres being free from one another and being movable under the slightest mechanical action. For instance, if the fibrous webs are produced by superposing a plurality of carded webs, it is very easy to separate the different layers from one another.

Consequently, in order to use the webs industrially, especially for the padding of garments and in furnishing applications, it is necessary to improve the cohesion of the webs without at the same time altering their bulk, thickness or suppleness.

A well-known technique for imparting cohesion to a fibrous web consists in subjecting the web to a needle-punching operation. However, such a technique is not suitable in the case of fibrous webs intended for padding, in view of the fact that the needle-punching action causes a densification of the web and hence a reduction in its bulk.

Currently, the only method used industrially for consolidating bulky fibrous webs whilst allowing them to retain considerable bulk consists in spraying a binder onto each face of the web and then drying this binder in a ventilated tunnel.

Whilst this treatment makes it possible to retain the bulk, it modifies the behavior of the web in respect of suppleness, handle and softness, depending upon the amount of binder deposited.

Furthermore, the fibres disposed inside the web which are not in contact with the external surfaces are not stabilised, so that this does not restrain the separation of the web at its middle, by delamination.

Given the disadvantages of this existing technique, a search has for a very long time been conducted for other ways of imparting cohesion to bulky fibrous webs without significantly affecting their suppleness, handle and bulk.

Thus, French Pat. No. 1,407,318 describes the treatment of webs containing heat-weldable fibres by means of an alternating high frequency current, causing the fibres to weld together in the treatment zone. This treatment can be carried out by passing the web between two electrodes which can be cylindrical and which also serve to drive the fibrous web. At least one of the electrodes carries a pattern, (for instance, triangular, rectangular or lozenge shaped) which is such that the welds are sufficiently close to one another to guarantee that each fibre of the web is bonded at least at one point over its length.

Such a process makes it possible to obtain a coherent web which exhibits bonding zones of low thickness, consisting of fibres welded to one another, separated by zones having a high bulk. However, it is not possible, with this process to obtain a bulky textile web which has a substantially smooth, uniform external surface and a handle, appearance and other textile properties which are unchanged.

It has also been proposed, in German Pat. No. 714,496, to impart cohesion to mats based on glass fibres by bringing about a local point-by-point fusion across the thickness of the mat. This process in general consists in producing sparks in localised zones, the sparks being directed through the thickness of the web. Its performance makes it necessary to cause the webs to advance stepwise, and it involves the use of mechanical elements, in fact needles which make it possible to perforate the web so as to form localised passage zones for the sparks.

Such a process does not prove satisfactory, firstly because only a low rate of production is possible and secondly because it is difficult to apply to materials other than those based on glass, because of the hazard of ignition due to the sparks.

Although French Pat. No. 2,313,185 relates to an improved device which permits the operation of the process described in the abovementioned German Patent so that the treatment by the sparks is carried out without stopping the web, the operation of this device requires the use of special electrodes so as to achieve good orientation of the sparks, and in particular the use of separated electrodes in the form of nipples.

Such a device has numerous disadvantages and in particular only makes it possible to achieve a uniform arrangement of perforations in the web. Furthermore, the creation of localised sparks results in rapid deterioration if the electrodes and in fouling of the equipment. Finally, the ignition hazard is very high.

According to the present invention there is provided a process for the treatment of bulky fibrous webs, which comprise, at least in part, thermoplastic fibres, so as to impart cohesion to the webs, said process including the steps of passing the web between at least one pair of rotating cylindrical metallic electrodes, with one electrode connected to a high frequency generator and the other to earth, the web being compressed between the electrodes and being driven by the electrodes, one of the electrodes being covered with a layer of dielectric material having a smooth surface, and the discharges produced between the electrodes being glow discharges, the paths of which extend over only a part of the insulating gap separating the two electrodes, starting from the electrode covered with the dielectric material and extending to near the surface of the other electrode.

The process of the invention is simple and efficient, and overcomes the disadvantages of the prior processes and makes it possible to treat bulky fibrous webs, derived at least partially from thermoplastic fibres, so as to impart cohesion to the webs while making it possible to retain both bulk and a considerable thickness after treatment. Further, there is virtually no change in the textile characteristics (handle, suppleness and the like) of the web.

Compared to the techniques of the prior art discussed above, the process of this invention does not employ arcs or sparks, but relies on the phenomenon known as "glow discharge".

In the description which follows, the words "glow discharge" and "partial discharge" will be used, without distinction, to denote the same phenomenon.

It is well-known that glow discharges exhibit characteristics, and have effects, which are totally different from arcs or sparks.

In fact, according to the definitions generally accepted by experts, glow discharge corresponds to an electrical conduction phenomenon in gases, which manifests itself by slight luminosity without substantial heat generation, without noise and without appreciable volatilisation of the electrodes, when the electrical field exceeds a certain value.

In contrast, an arc or a spark is a luminous discharge of electricity through a gas, characterised by a high current density and a low potential gradient, frequently accompanied by partial volatilisation of the electrodes; a spark only differs from an arc by its short duration.

Even though glow discharges, arcs and sparks can occur in all gases and under all gas pressures when the electrical field to which the gas is subjected reaches a critical value, they nevertheless exhibit a fundamental difference, namely that an arc (or spark) necessarily causes a substantial temperature rise of the gas contained in the path followed by the arc or spark, whilst glow discharge is, by definition, a phenomenon without great generation of heat.

Two other criteria also make it possible to differentiate between an arc or spark and a glow discharge, namely: the liminosity is slight in the case of a glow discharge and appears to the eye to be mauve in color, whilst an arc is very luminous, with a predominance of red and yellow, and when they take place in air, arcs give rise to nitrogen oxides and to very little ozone, whilst a glow discharge produces almost only ozone.

The use of a glow discharge or of a partial discharge for treating various materials has been known for a very long time and is in particular described in French Patent 1,582,162 for the purpose of altering the surface structure of films or of fibres so as to change their properties, in particular to obtain a pleasanter handle of the fibres and/or to improve certain physical or physico-chemical characteristics. However, it was completely unexpected and unforeseeable that the treatment of bulky fibrous webs by a glow discharge process, under the conditions specified herein, would result in a consolidation of the webs without deterioration of their textile characteristics and whilst preserving their considerable thickness and bulk. In fact, taking account of earlier knowledge, it could have been expected that a simple surface modification of the fibres forming the web would occur, and not a bonding of these fibres to one another.

Whilst the process according to the invention can be carried out by subjecting the web, for certain applications, to only a single pass between the electrodes, it can be advantageous to subject the web to two successive treatments in opposite directions, either discontinuously, by effecting a second pass of the web between the electrodes after having turned the web over, or continuously, by using two pairs of electrodes, those of the second pair being inverted relative to those of the first.

Furthermore, in a preferred aspect, the process according to the invention can also be used not only to impart cohesion to a bulky fibrous web but also to combine this web, either externally or internally, with additional layers of another material, so as to form a composite material. Thus, it is possible to combine the fibrous web with an external layer on one or both of its faces; this layer can for example consist of a non-woven material obtained directly from a spinning stage, of a sheet of synthetic foam, such as a polyurethane foam, or of any fabric based on a thermoplastic or non-thermoplastic textile material.

According to the invention, if it is desired to combine an external layer with the fibrous web, this layer is preferably introduced between the electrodes on the side of the electrode which is covered with dielectric material.

The process according to the invention also makes it possible to incorporate a reinforcing layer in the interior of the fibrous web. In this case, the fibrous web which is introduced between the electrodes consists of two separate elementary webs and the reinforcing layer is trapped between these two webs during the treatment.

As in the case of the external layers, this internal web can be based on any material, such as nonwovens, foams, woven fabrics and the like.

Furthermore, it has been found that when an external or internal layer is combined with a web and treated according to the invention, and where such layer is based on a non-thermoplastic material, for example consisting of a cotton gauze or rayon gauze, it is, after treatment, nevertheless perfectly bonded to the fibrous web. If an external layer based on a non-thermoplastic material is thus bonded to the web, as stated above, it is preferably introduced between the electrodes on the side of the electrode which is covered with the dielectric material, and the bond to the fibrous web is produced at the perforations, the non-thermoplastic external layer itself being free from perforations.

In another aspect the invention provides a device for the treatment of bulky fibrous webs comprising at least one pair of rotatable cylindrical metallic electrodes, one said electrode being connected to a high frequency generator and the other said electrode being connected to earth, means for feeding material to be treated to the electrodes and means for receiving treated material downstream of the electrodes, wherein one of said electrodes is covered by a layer of dielectric material having a smooth surface, the spacing between said electrodes is markedly less than the thickness of the web to be treated, and the voltage applied by the generator is such that the discharges between the electrodes are partial discharges, the path of which extends over only a part of the insulating gap separating the electrodes, starting from the electrode covered with the dielectric material and extending to near the surface of the other electrode.

The device can optionally comprise two pairs of electrodes, the discharge produced between the second pair being in the opposite direction to those of the first.

The surface of the electrode not covered with dielectric material can either be smooth or can consist of an alteration of raised zones and recessed zones. If the electrode possesses such raised zones, the latter can be either in the form of continuous rings spaced apart from one another or preferably in the form of pyramids arranged uniformly relative to one another; these pyramids may have a triangular, square or circular base.

Advantageously, such pyramids are located in a spiral arrangement on the periphery of the electrode.

Figure 5:
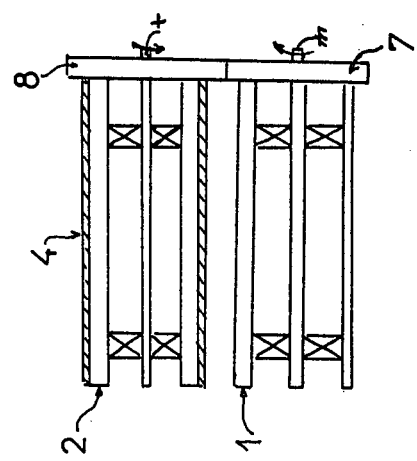
Figure 3:
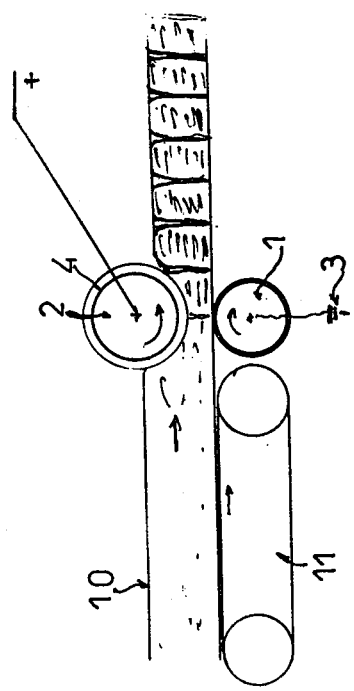
Figure 4:
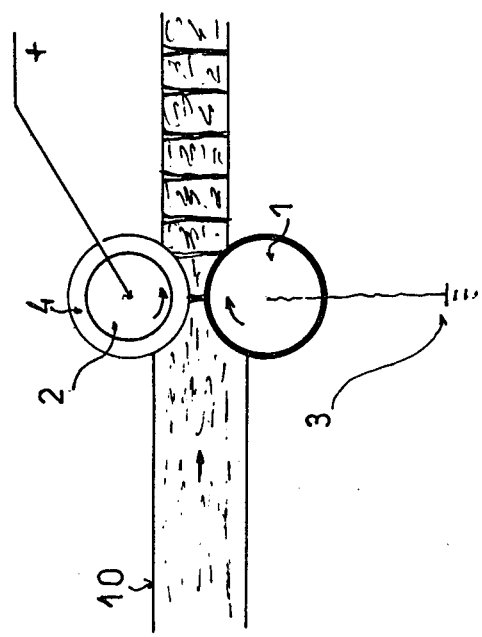
Figure 6:
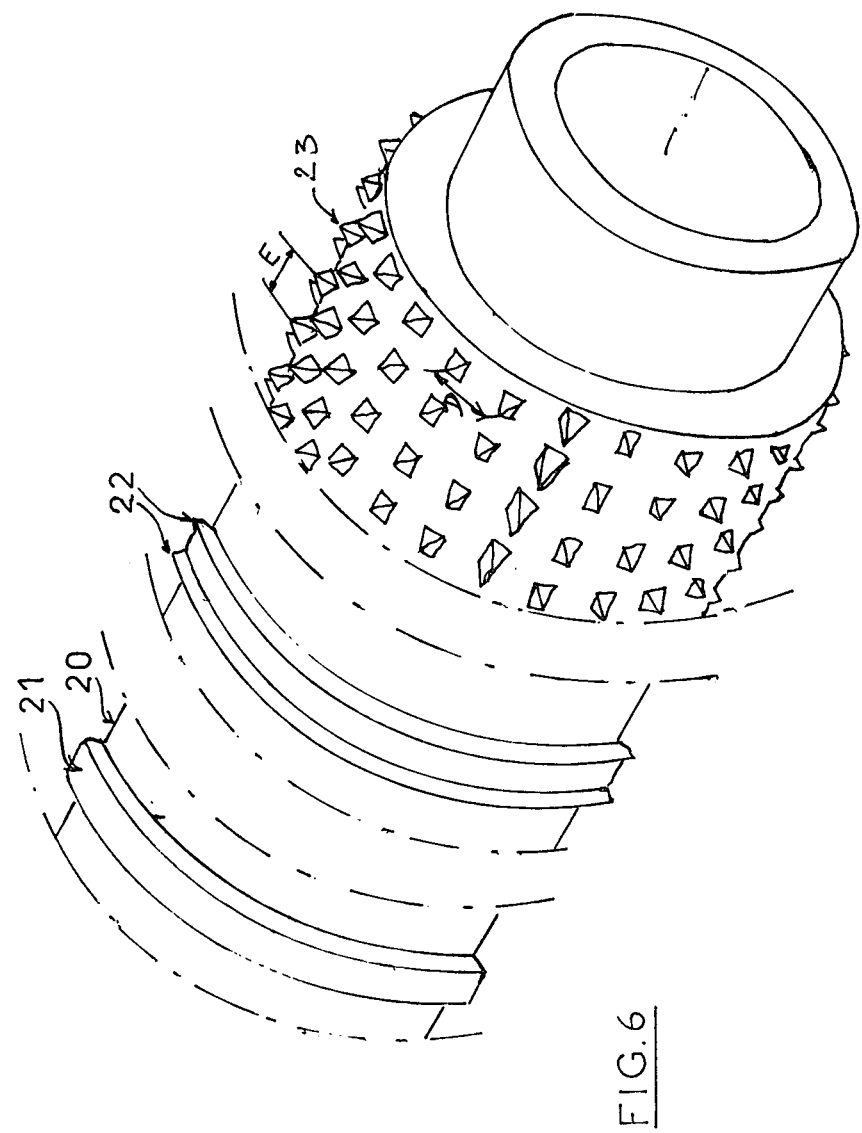

In order that the invention may be more clearly understood, the following description is given, merely by way of example, with reference to the accompanying drawings in which:

FIGS. 1 and 2 schematically illustrate an installation on which the process according to the invention can be performed;

FIGS. 3 and 4 schematically illustrate, in side view, ways in which the fibrous web can be passed between the electrodes;

FIG. 5 is a schematic cross-section of two electrodes having smooth surfaces, showing in greater detail the way in which they are mounted and are driven relative to one another; and FIG. 6 is a schematic perspective view showing different embodiments of the electrode which is not covered with dielectric material and exhibits raised portions on its surface.

FIG. 1 illustrates an installation on which the process according to the invention can be performed. This installation essentially consists of at least one pair of cylindrical electrodes 1, 2, of which one, in this case the electrode 1, consists of a stainless metal, for instance an aluminium alloy and is connected to the earth 3. The other electrode 2 also consists of a stainless metal and is covered with a layer 4 of dielectric material and is connected, via a high voltage transformer 5, to a high frequency generator 6.

A dielectric material which is particularly suitable for carrying out the invention, is that material which is marketed under the trademark Hypalon.

The electrode 2 covered with dielectric material has a smooth surface and the other electrode 1 can either have a smooth surface (FIGS. 1, 2, 3, 4, and 5) or can, as is illustrated in FIG. 6, have raised zones on its surface.

Such raised zones, see FIG. 6, can be defined between rings 20, uniformly spaced across the width of the electrode, and have an external surface which is either plane, 21, the edges however being slightly curved, or which possess ridges 22. Preferably, however, the raised parts are in the shape of pyramids 23 uniformly spaced from one another and having a square or triangular or rectangular or even circular base. In this case, the pyramids 23 can be arranged in a spiral arrangement on the periphery of the electrode.

The electrodes 1, 2 are rotationally driven, for example as shown in FIG. 4, by causing the rotation of one of the electrodes, which transmits its movement to the other electrode, for example by means of a gearwheel 7 which drives a gearwheel 8 (FIG. 5).

The spacing between the two electrodes as well as the frequency of the treatment are regulated in accordance with the webs to be treated, but the spacing is always markedly less than the thickness of the web.

In cases where the two electrodes have smooth external surfaces, for fibrous webs which are usually employed in padding and whose weight may vary between 150 grams and 250 grams per square meter whilst their thickness is between 20 millimeters and 40 millimeters, the spacing between the electrodes is in general between 1 millimeter and 3 millimeters and the treatment frequency is between 10 kilohertz and 30 kilohertz, whilst the high voltage transformer produces a potential difference of between 10 and 20 kilovolts (KV) between the electrodes.

As stated above, whilst the electrode not covered with dielectric material can have a smooth surface, it can also have a different shape and possess raised zones. In cases where these zones consist of a plurality of rings (FIG. 6), it is thus possible only to impart cohesion to the material in certain zones thereof, corresponding to the said rings. Where, as is preferable, the raised zones are in the shape of small pyramids 23, the spacing between the apices of the pyramids and the electrode covered with dielectric material is, as above, in general between 1 millimeter and 3 millimeters but preferably about 1.5 millimeters. Such an embodiment makes it possible to treat much thicker webs weighing up to 500 grams/m$^2$ or more, whilst preserving the very high bulk of the webs after treatment.

Furthermore, the raised portions in the form of pyramids are particularly advantageous as a result of the fact that they allow a gradual compression of the web, avoid soiling and tearing of the fibres and permit markedly higher production speeds.

The mode of operation of such an installation is as follows.

The bulky fibrous web 10 coming either from an independent storage source or preferably directly from the device on which it is produced, is introduced between the two electrodes 1 and 2, the spacing of which is markedly less than the thickness of the web. These electrodes drive and compress the web 10 and subject it to a series of partial electrical discharges or glow discharges. These discharges are produced by a high voltage generator 6 and cause, in the web 10, fine perforations which are each essentially in the shape of a small shaft-like passage, constricted at its end.

The path of the discharges develops only over part of the gap separating the two electrodes 1 and 2, from the electrode 2 covered with dielectric material to the vicinity of the surface of the electrode 1. These perforations are produced in the direction of the thickness of the web and are distributed at random, the fibres forming the web being welded to one another (see FIGS. 3 and 4). The web to be treated is advantageously introduced between the electrodes by means of a conveyor belt 11 which allows the untreated material to be supported before it is introduced. After treatment, the web is wound up, for example by means of a conventional surface winder 12 located downstream of the electrodes. Furthermore, a chamber 13 extending across the entire width of the electrodes is located above the electrodes and is connected to a suction system (not shown), which allows the removal of the ozone produced.

The perforations produced in the web are, as stated above, arranged at random, but their distribution is nevertheless fairly uniform.

By virtue of this process it is possible to treat fibrous webs which exhibit virtually no cohesion, whilst the bonding of the fibres achieved after treatment does not result in any change in the general orientation of the said fibres and the thickness of the web obtained remains very high; only a slight compaction, due to the momentary compression between the rollers, remains.

Each perforation has a function comparable to a very flexible hollow rivet which is very elastic and is imperceptible to the touch, but the function of which is to stabilise the web by point welds of the fibres to one another around the perforation. The perforations are, as mentioned, small shaft-like passages which are constricted at one end, are very elastic and very stable, and connect the two faces of the material. It is obvious that to carry out the process the treated web must consist at least partially of thermoplastic fibres (polyamide, polyester, polypropylene and the like), but these fibres can optionally be mixed with artificial or natural fibres.

Furthermore, it has been found that it is advantageous, especially when using polyester fibres, that the fibres should be crimped beforehand.

Finally, as already stated, the invention makes it possible to combine a treated bulky fibrous web with one or more external webs, these external webs being bonded to the surface of the web on which they have been placed directly during the treatment. Thus, if a gauze of cotton or staple rayon, a woven fabric, a knitted fabric or a sheet of a synthetic foam (for example polyurethane foam) is superposed on the fibrous web and if the whole is fed between the two electrodes, taking care however, to place the layer to be bonded on the side of the electrode coated with the layer of dielectric material, a point-by-point welding of the external layers to the fibrous web is achieved. It has been found, surprisingly, and contrary to what takes place with a spark treatment, that when the external material is based on a non-thermoplastic material, for example based on cotton or staple rayon, bonding to the internal fibrous web still takes place, but without perforation of the external material and hence without a change in its textile handle.

This is of great value, especially for certain applications, such as wall coverings, where the external material serves as the decorative component.

Where appropriate, it is possible to envisage the incorporation of a reinforcing product, for example a film, a woven fabric, a non-woven or a foam, between two elementary fibrous webs to be treated by the above method, the various layers being firmly bonded to one another during the pass between the electrodes.

The examples which follow show more clearly the advantages provided by the invention.

In these examples, the installation used has the following characteristics:

electrode 1: diameter 100 millimeters, length 1 meter, made of aluminium alloy, electrode 2, diameter 100 millimeters, length 1 meter, this electrode also being made of an aluminium alloy and being covered with a layer, 2 millimeters thick, of dielectric material marketed under the trademark Hypalon, speed at which the web is driven by the electrodes: variable between 1 meter per minute and 10 meters per minute, spacing between the electrodes: from 1 millimeter to 3 millimeters, high frequency generator: allows the treatment of the material at between 10 kilohertz and 30 kilohertz, transformer: allows a potential difference of between 10 and 20 kilovolts to be applied between the electrodes.

EXAMPLE 1

A fibrous web based on polyester fibres having a gauge of 6.6 decitex and a length of 60 millimeters is treated on the installation described above, which is illustrated more particularly by FIGS. 1, 2, 3, 4 and 5 and which possesses an aluminium alloy electrode 1 having a smooth peripheral surface.

This web, produced by carding and sheet-forming, consists of a plurality of superposed thin webs, weighs about 200 grams per square meter and has a thickness of 45 millimeters.

The spacing between the electrodes is set to 1.5 millimeters.

The speed of travel of the web is 2 meters per minute.

The frequency is 20 kilohertz.

After treatment, the web has a thickness of about 35 millimeters and exhibits 200 fine perforations per 100 square centimeters, these perforations being distributed at random.

The textile properties (handle and suppleness) of the web are virtually unchanged by the treatment and the web exhibits very good resistance to delamination compared to an untreated web.

Such a web can advantageously be used as a padding material, for example in anoraks.

EXAMPLE 2

The same polyester web as above is used, as well as an electrode 1 having a smooth surface, but prior to passing the web between the two electrodes 1 and 2, the web is trapped between two layers of a non-woven material based on polypropylene, the non-woven material being produced by extrusion spinning and weighing 15 grams per square meter.

In the attached figures, the feed of the polypropylene films is not shown, but these are superposed on the web on either side thereof, immediately before passing between the two rotating electrodes.

On leaving the treatment device, the three layers of material are perfectly bonded to one another, but nevertheless the combination retains all its textile properties and can be used, for example, directly as padding, with the external layers of the non-woven preventing any outward migration of the fibres of the web.

EXAMPLE 3

Using the same treatment conditions as in Example 1, a polyester web identical to that of Example 1 is combined with a 2 millimeters thick polyurethane foam sheet.

The foam sheet is introduced at the side of the web adjacent the electrode coated with the layer of dielectric material (electrode 2). After treatment, the two layers are perfectly bonded to one another.

Such a material can also be used in padding.

EXAMPLE 4

Under the same conditions as in Example 1, and using the same web of polyester, a cotton gauze weighing 30 grams per square meter is passed between the two electrodes, simultaneously with the passage of the web, this gauze being applied to the web on the side adjacent the electrode which is covered with the dielectric material. The two layers of material are, after treatment, perfectly bonded to one another, the cotton gauze being bonded to the fibrous web but, surprisingly, not showing any perforations.

EXAMPLE 5

The same equipment is used as in the preceding examples, but the electrode 1 has in this case an external surface consisting of an alternation of raised zones and recessed zones, the raised zones consisting of small pyramids such as those illustrated in FIG. 6.

These pyramids are produced by cutting the body of the electrode and their apices are located on a circle of external diameter 100 millimeters. The spacing E between two successive pyramids is 8 millimeters and the circumferential spacing D is 14 millimeters.

These pyramids each have a square base of 4 millimeters and a height of 5 millimeters.

The setting of this installation is similar to that of the preceding examples, but the spacing between the cylinder 2 covered with the layer of dielectric material and the apices of the pyramids is 1.4 millimeters.

Furthermore, in this case, the speed of travel of the web is set to 7 meters per minute.

A web based on polyester fibres of gauge 6.6 decitex and length 60 millimeters is treated on this installation. This web weighs 500 grams per square meter and has a thickness of about 100 millimeters.

The frequency is also regulated to be 20 kilohertz.

After treatment, the web has a thickness of about 60 millimeters, exhibits very good cohesion and especially very good resistance to delamination, and has virtually unchanged textile characteristics. It possesses about 64 perforations per 100 square centimeters.

It is also very suitable for use as a padding material, especially for anoraks.

EXAMPLE 6

Example 5 is repeated, but before introducing the web between the electrodes, a cotton gauze weighing 30 grams per square meter is superposed on the web surface facing the electrode 2, which electrode is covered with the dielectric material.

As in Example 4, the gauze is perfectly bonded to the fibrous web; the latter has 64 bonding points per 100 square centimeters, and the gauze exhibits no trace of perforations.

EXAMPLE 7

Example 6 is repeated, but the second face of the fibrous web is covered with a second gauze also weighing 30 grams per square meter. For this purpose, either a second pass is carried out, the web being turned over and the second gauze being superposed in the same way as in Example 6, or, preferably, the process is carried out continuously using an installation comprising two pairs of electrodes, the electrodes of the second pair being inverted relative to those of the first pair and the second gauze also thus being fed onto a surface of the web which in one pair of electrodes or the other faces an electrode covered with dielectric material.

In this way, a fibrous web trapped between two gauzes is obtained.

EXAMPLE 8

Two fibrous webs each weighing 270 grams per square meter, having a thickness of about 50 millimeters and consisting of polyester fibres of gauge 6.6 decitex and length 60 millimeters are fed between two electrodes of the type used for the preceding Examples 5, 6 and 7. Before the pass between the electrodes, a cotton gauze weighing 30 grams per square meter is introduced between the two webs.

A second pass is carried out either by turning the web over or by treating it between two electrodes arranged in the converse manner to the first two.

In this way, a composite material possessing about 120 perforations per 100 square centimeters and having a thickness of about 50 millimeters is obtained. The internal gauze is perfectly bonded to the two fibrous layers and strengthens the stability of the web obtained.

EXAMPLE 9

Example 8 is repeated, but the gauze is replaced by a sheet of polyurethane foam 2 millimeters thick.

A composite material having very high dimensional stability and exhibiting a further improvement in its insulating capacity is obtained.

The preceding examples clearly show the advantages provided by the invention, and especially the fact that it is possible to obtain, in a simple and economical manner, bulky fibrous webs, whose textile characteristics are not worsened by the treatment, and which exhibit very high cohesion and, especially, very good resistance to delamination. Furthermore, such a process makes it possible to produce various composite materials directly in a single operation, which was impossible with the earlier processes for the treatment of bulky fibrous webs.

Obviously the invention is not limited to the embodiments described above but also embraces all variants performed in the same general sense.

Thus, whilst in the present case the invention has been described more particularly for the treatment of bulky fibrous webs intended for padding, it is obvious that such webs could be used in other fields, and that appropriate supplementary treatments, for example with a view to medical applications can be performed.

We claim:

1. A process for treatment of a bulky fibrous web formed at least in part of thermoplastic fibers and the web having considerable thickness comprising the steps of:
    (a) passing the web between at least one pair of rotating cylindrical metallic electrodes, the electrodes being spaced apart to provide an insulating gap therebetween and one electrode connected to a high frequency generator and the other electrode to earth and one electrode being covered with a layer of dielectric material having a smooth surface;
    (b) compressing the web between the electrodes and the web being driven by the electrodes; and
    (c) creating glow discharges between the electrodes from the high frequency generator and the discharge path extending only a part of the insulating gap separating the two electrodes, and the glow discharge starting from the electrode covered with dielectric material and extending to near the surface of the other electrode through substantially the thickness of the web whereby cohesion is imparted to the web which retains its bulk, thickness and textile characteristics existing before the web is subjected to the above steps.

2. A process according to claim 1, wherein the fibrous web is passed between two successive pairs of such rotating cylindrical metallic electrodes, the discharges produced between the second pair of electrodes being in the opposite direction to those produced in the first pair of electrodes.

3. A process according to claim 1, wherein the fibrous web is combined with at least one additional layer as it is passed between the electrodes.

4. A process according to claim 3, wherein, as it is passed between the two electrodes, the fibrous web is combined with at least one external layer introduced between the electrodes on the side of the web adjacent the electrode covered with the layer of the dielectric material.

5. A process according to claim 3, wherein the fibrous web introduced between the electrodes consists of two elementary webs with an internal layer introduced between them before passage between the electrodes.

6. A process according to claim 3, wherein the additional layer is based on a non-woven material obtained directly from a spinning process.

7. A process according to claim 3, wherein the additional layer is a synthetic foam.

8. A process according to claim 3, wherein the additional layer is based on a non-thermoplastic material.

9. A process according to claim 3, wherein the additional layer is a cotton or rayon gauze.

* * * * *